J. FLINNER.
GATE.
APPLICATION FILED DEC. 11, 1911.
1,043,760.
Patented Nov. 5, 1912.
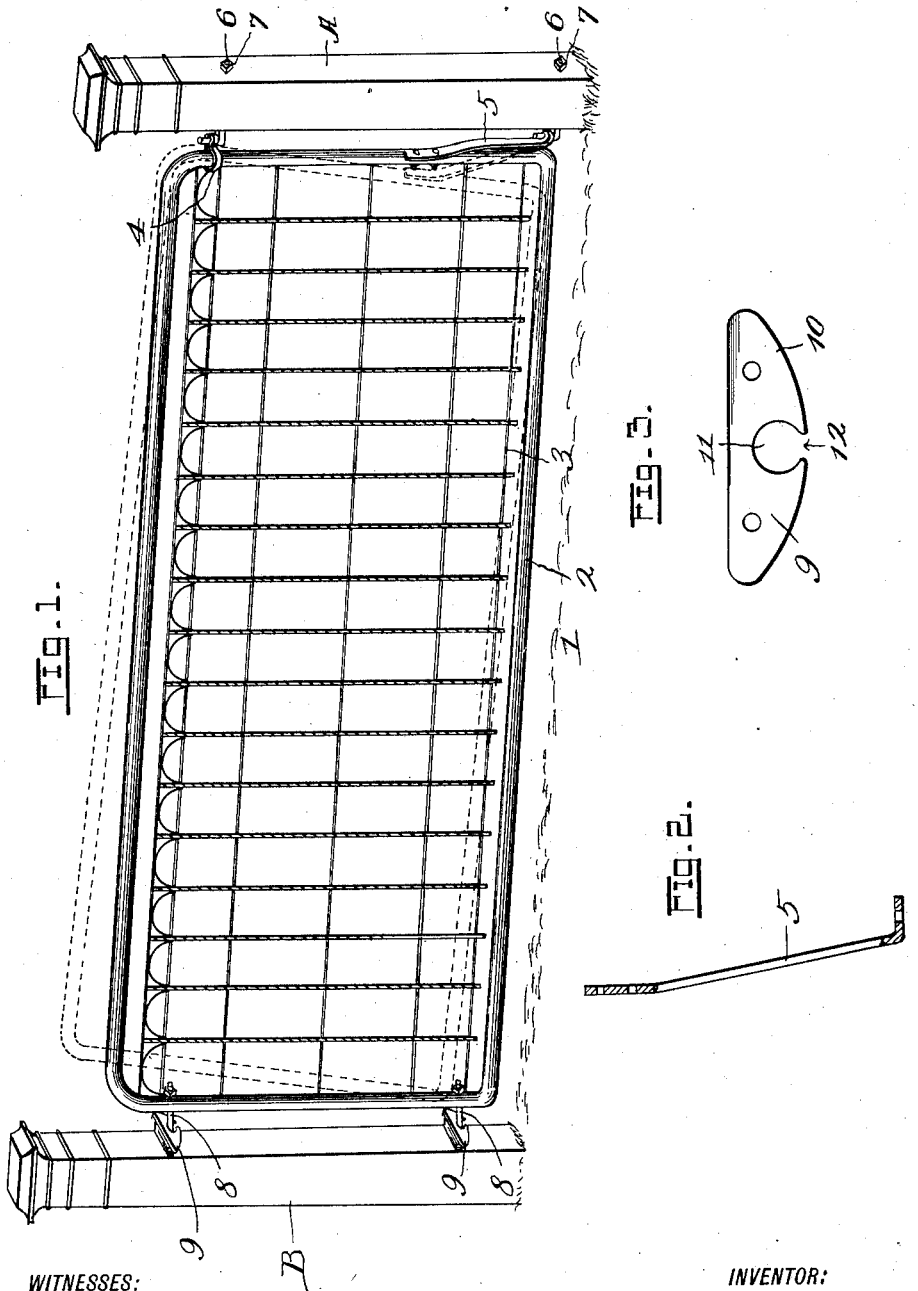
WITNESSES:
E. C. Lilliau
P. C. Fischer
INVENTOR:
John Flinner,
BY F. G. Fischer,
ATTORNEY

UNITED STATES PATENT OFFICE.

JOHN FLINNER, OF LEAVENWORTH, KANSAS.

GATE.

1,043,760.  Specification of Letters Patent.  Patented Nov. 5, 1912.

Application filed December 11, 1911. Serial No. 665,034.

*To all whom it may concern:*

Be it known that I, JOHN FLINNER, a citizen of the United States, residing at Leavenworth, in the county of Leavenworth and State of Kansas, have invented certain new and useful Improvements in Gates, of which the following is a specification.

My invention relates to new and useful improvements in gates, and my object is to provide a swinging gate which may be used to advantage as a yard gate, a farm gate, and stock-yard gate, or in fact any place where a swinging gate is employed.

Among the advantages of my gate the more important are: first, the gate is mounted to swing in either direction so that a passerby may readily open the gate and pass through the gateway either when mounted or afoot; second, when the gate is unlatched it will swing open of its own accord; third, when the gate swings open it also raises and will thus clear snow or any other obstruction in the roadway; fourth, the gate can not be raised or opened when latched, by hogs attempting to crawl beneath the same, and fifth, the gate can not be opened by cattle pushing against the same.

Other advantages of the invention will hereinafter appear, and in order that said invention may be fully understood reference will now be made to the accompanying drawing in which:

Figure 1 is a perspective of the gate latched in full lines and unlatched in dotted lines. Fig. 2 is a detail of a spring hinge-member forming one of the important features of the invention. Fig. 3 is a detail of a latch-keeper which coacts with the spring hinge-member in holding the gate in closed position.

In carrying out the invention I employ a gate 1, which may be of any ordinary or preferred form. In the drawing I have shown the gate consisting of a rectangular frame 2 and a wire grille 3 secured to said frame 2. Frame 2 is provided at one end with an upper hinge-member 4 and a lower resilient hinge-member 5, both of which pivotally-engage the upturned ends of a pair of hinge members 6 extending through a rear post A and secured with retaining-nuts 7. The hinge member 5 is formed with a flat spring bar the upper end of which is rigidly secured to one end of the gate 1, the central portion of the bar being inclined downwardly toward the post A, while the lower end of said bar is turned outwardly at right angles and perforated to receive the upturned end of lower hinge member 6. The front end of frame 2 is provided with upper and lower latch-members 8, rigidly-secured thereto and adapted to engage a pair of latch-keepers 9 secured to a front post B. Each latch-keeper 9 has a curved underside 10 sloping to a centrally-disposed circular hole 11, with which it communicates through a narrow slot 12, to admit the forward end of its respective latch-member 8. The spring hinge-member 5 is bent, so that it will be under tension when the gate is closed and thus reliably hold the latch-members 8 against the upper sides of holes 11 in the latch-keepers 9, so that it will be impossible for hogs or cattle to open the gate by lifting upwardly or pushing laterally thereon. It will also be impossible to open the gate by pushing downward thereon unless the latch-members 8 are brought into coincidence with slots 12 in the latch-keepers 9.

To open the gate the front end thereof is depressed until the latch-members 8 pass outward through slots 12 in the latch-keepers 9. The gate is then pushed in the direction in which it is desired to have it swing and released, when the spring-member 5, which has been under tension, immediately tips the forward end of the gate upward, as shown by dotted lines Fig. 1, so that said gate will continue to swing open and clear obstacles in the roadway.

In closing the gate the front end thereof is depressed until the latch-members 8 engage the curved undersides 10 of the latch-keepers 9, said curved undersides directing the latch-members 8 to the slots 12, which they enter and are then carried upward against the top sides of holes 11 by the front end of the gate, which is raised by the spring-hinge member 5.

From the foregoing description it will be understood that I have produced a simple and inexpensive gate which possesses the advantages above enumerated.

Having thus described my invention what I claim and desire to secure by Letters Patent, is:

1. In combination with a pair of gate posts and a gate, an upper hinge connection between one post and one end of the gate, a lower hinge member carried by said post and having an upturned end, a spring bar having its upper end rigidly secured to said end of the gate and having its central portion inclined downwardly toward said post, the lower end of said bar being turned outwardly at right angles and being perforated to receive said upturned end of the lower hinge member, latch members on the opposite end of the gate and latch keepers on the other post.

2. In combination with a pair of gate posts and a gate, an upper hinge connection between one post and one end of the gate, latching means between the opposite end of the gate and the other post, and a vertical spring bar connected to the first named end of the gate adjacent the bottom thereof and movably connected to the first named post.

3. In combination with a pair of gate posts and a rigid gate, an upper hinge connection between one post and one end of the gate, latching means movable to open position by depression of the gate between the opposite end of the gate and the other post, and spring means located in the space between the lower portion of the first named end of the gate and the first named post and being connected to each for exerting upward tension on the gate.

In testimony whereof I affix my signature, in the presence of two witnesses.

JOHN FLINNER.

Witnesses:
F. G. FISCHER,
E. C. LILLIAN.

Copies of this patent may be obtained for five cents each, by addressing the "Commissioner of Patents, Washington, D. C."